(12) United States Patent
Lopushansky et al.

(10) Patent No.: US 7,930,938 B2
(45) Date of Patent: Apr. 26, 2011

(54) SYSTEM FOR DETERMINING FLUID LEVEL

(75) Inventors: Richard L. Lopushansky, The Woodlands, TX (US); Larry A. Jeffers, Minerva, OH (US)

(73) Assignee: Davidson Instruments Inc., The Woodlands, TX (US)

( * ) Notice: Subject to any disclaimer, the term of this patent is extended or adjusted under 35 U.S.C. 154(b) by 897 days.

(21) Appl. No.: 11/788,000

(22) Filed: Apr. 18, 2007

(65) Prior Publication Data

US 2007/0251317 A1 Nov. 1, 2007

Related U.S. Application Data

(60) Provisional application No. 60/792,694, filed on Apr. 18, 2006.

(51) Int. Cl.
*G01F 23/00* (2006.01)
(52) U.S. Cl. .......................................... 73/299
(58) Field of Classification Search ............... 73/299, 73/302
See application file for complete search history.

(56) References Cited

U.S. PATENT DOCUMENTS

| | | | |
|---|---|---|---|
| 2,521,477 A * | 9/1950 | Pellettere | 73/299 |
| 3,886,795 A * | 6/1975 | Thompson | 73/299 |
| 4,747,062 A | 5/1988 | Esau | |
| 5,566,571 A | 10/1996 | Kasai et al. | |
| 6,220,091 B1 | 4/2001 | Chen et al. | |
| 6,510,736 B1 | 1/2003 | Van Ee | |
| 6,513,376 B1 | 2/2003 | Prather et al. | |
| 6,826,956 B1 | 12/2004 | Mathews | |
| 7,000,467 B2 * | 2/2006 | Chu et al. | 73/299 |
| 7,251,998 B2 * | 8/2007 | Gourlay et al. | 73/299 |

* cited by examiner

*Primary Examiner* — Hezron Williams
*Assistant Examiner* — Alex Devito
(74) *Attorney, Agent, or Firm* — McDonald Hopkins LLC

(57) ABSTRACT

The present invention is directed to a system for determining a fluid level in a vessel. The system comprises a first differential pressure transducer, a second differential pressure transducer, a pressure delivery system, and a fluid passage. The first differential pressure transducer includes a first side and a second side. The first side is selectively in fluid communication with a portion of the vessel above the fluid level. The second differential pressure transducer includes a third side and a fourth side. The third side is selectively in fluid communication with a portion of the vessel below the fluid level. The fluid passage is in fluid communication with the second side of the first transducer, the fourth side of the second transducer, and the pressure delivery mechanism.

14 Claims, 5 Drawing Sheets

SYSTEM FOR DETERMINING FLUID LEVEL

CROSS-REFERENCE TO RELATED APPLICATION

This non-provisional patent application claims the benefit of U.S. Provisional Patent Application No. 60/792,694, entitled "FIBER OPTIC DIFFERENTIAL PRESSURE LEVEL MEASUREMENT APPARATUS WITH ACTIVE REMOTE SEAL," filed Apr. 18, 2006, which is hereby incorporated in its entirety.

FIELD OF THE INVENTION

The present invention relates in general to differential pressure measurement apparatus and, more particularly, to differential pressure measurement apparatus for measuring the level of fluid in a vessel.

BACKGROUND

It is known in the prior art to use differential pressure measurements to determine the level of fluid in tanks and vessels. A conventional practice for using differential pressure measurements is to attach a differential pressure transducer near the bottom of a vessel and to expose one side of the differential pressure transducer to the fluid in the vessel. To account for the static vapor pressure in the vessel, a remote seal is positioned near the top of the tank. The remote seal directly exposes the other side of the differential pressure transducer to the static vapor pressure in the vessel. This arrangement is illustrated in the prior art system shown in FIG. 1.

Such prior art arrangements have encountered a number of problems that prevent the measurement of liquid levels in vessels or result in highly inaccurate measurements. A first problem is that such arrangements are sensitive to temperature changes. A second problem is that a remote seal may be susceptible to plugging or clogging. A third problem is hydrogen migration or permeation when such arrangements are used with vessels containing hydrogen. A fourth problem is condensation within the measurement apparatus. A fifth problem is leakage of fill-fluid used in measurement apparatus.

FIG. 1 illustrates a system 10 with a differential pressure transducer 12 located near the bottom of a vessel 14 and a remote seal 16 located near the top of the vessel 14. The system 10 includes an external fill-fluid line 18 extending from the differential transducer 12 to the remote seal 16. The vessel 14 is designed to store fluid and normally includes vapor or other such gases occupying the space 20 above the fluid level 22. In the arrangement illustrated in FIG. 1, the pressure produced by such vapor, i.e., the static vapor pressure of the vessel 14, is directly accessed by the remote seal 16 coupled to the vessel 14 near the top of the vessel 14. The fill-fluid line 18 provides a fluid path between the remote seal 16 and the differential pressure transducer 12.

The static vapor pressure is transferred to the differential pressure transducer 12 by applying a force to fill-fluid in the fill-fluid line 18 through the remote seal 16. The pressure produces a force on the fill-fluid, which in turn produces a force on the differential pressure transducer 12.

The system 10 remains sensitive to temperature changes because the remote seal is a closed hydraulic system. If the system 10 experiences a drop in temperature, the fill-fluid contracts and when the temperature increases, the fill fluid expands. Unless the diaphragm at the remote seal is very compliant, significant error is introduced to the measurements. Under such conditions, the pressure sensed by the differential pressure transducer 12 due to the static vapor pressure of the vessel 14 will not be reflective of the actual static vapor pressure in the vessel 14 nor the actual liquid level.

When the system 10 of FIG. 1 is exposed to a cold environment, the viscosity of the fill-fluid may cause a failure of the system 10. The viscosity of the fill-fluid may become high enough to clog the fill-fluid line 18. In such a state, the fill-fluid will not transmit forces due to the static vapor pressure of the vessel 14 to the differential pressure transducer 12.

If the vessel includes a hydrogen-rich fluid, hydrogen will dissolve into the fill-fluid. The addition of hydrogen to the fill-fluid may change the density of the fill-fluid, thus decreasing the accuracy of any measurements. In addition, as the static vapor pressure in the vessel 14 is lessened, the hydrogen in the fill-fluid will expand and bubble out of the fill-fluid, which also decreases accuracy of measurements and may cause the diaphragm to burst.

The accuracy of the system 10 may also be compromised due to very small leaks of fill fluid from the remote seal 16 or fill fluid line 18. Any of these occurrences will jeopardize the accuracy of any measurements produced by the system 10.

As the prior art includes a number of drawbacks, there is a need for systems and methods for accurately determining the level of fluid in a vessel.

SUMMARY OF INVENTION

The present invention is directed to a system for determining a fluid level in a vessel. The system comprises a first differential pressure transducer, a second differential pressure transducer, a pressure delivery system, and a fluid passage. The first differential pressure transducer includes a first side and a second side. The first side is selectively in fluid communication with a portion of the vessel above the fluid level. The second differential pressure transducer includes a third side and a fourth side. The third side is selectively in fluid communication with a portion of the vessel below the fluid level. The fluid passage is in fluid communication with the second side of the first transducer, the fourth side of the second transducer, and the pressure delivery mechanism.

DESCRIPTION OF THE DRAWINGS

Operation of the invention may be better understood by reference to the following detailed description taken in connection with the following illustrations, wherein.

DETAILED DESCRIPTION OF THE INVENTION

While the present invention is described with reference to the embodiments described herein, it should be clear that the present invention should not be limited to such embodiments. Therefore, the description of the embodiments herein is illustrative of the present invention and should not limit the scope of the invention as claimed.

Figure 1:
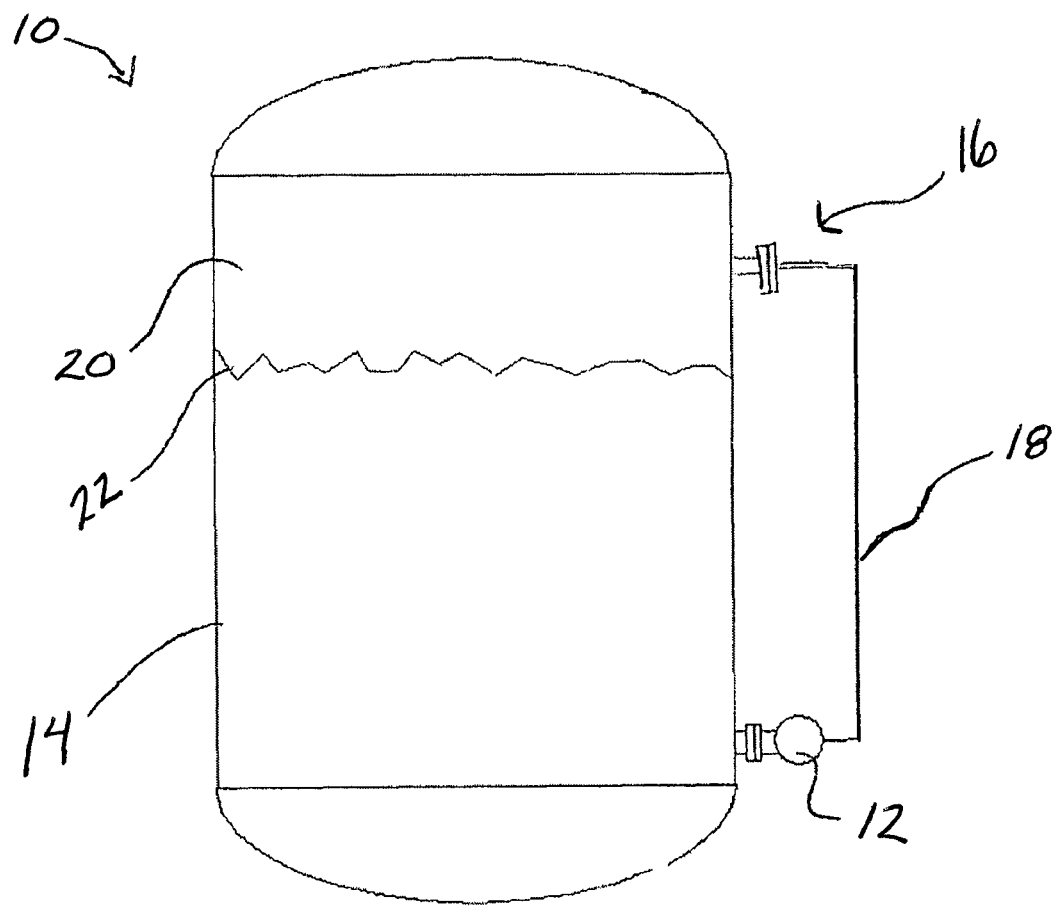
FIG. 1 is a schematic of a prior art system for measuring a level of fluid in a vessel.
Figure 2:
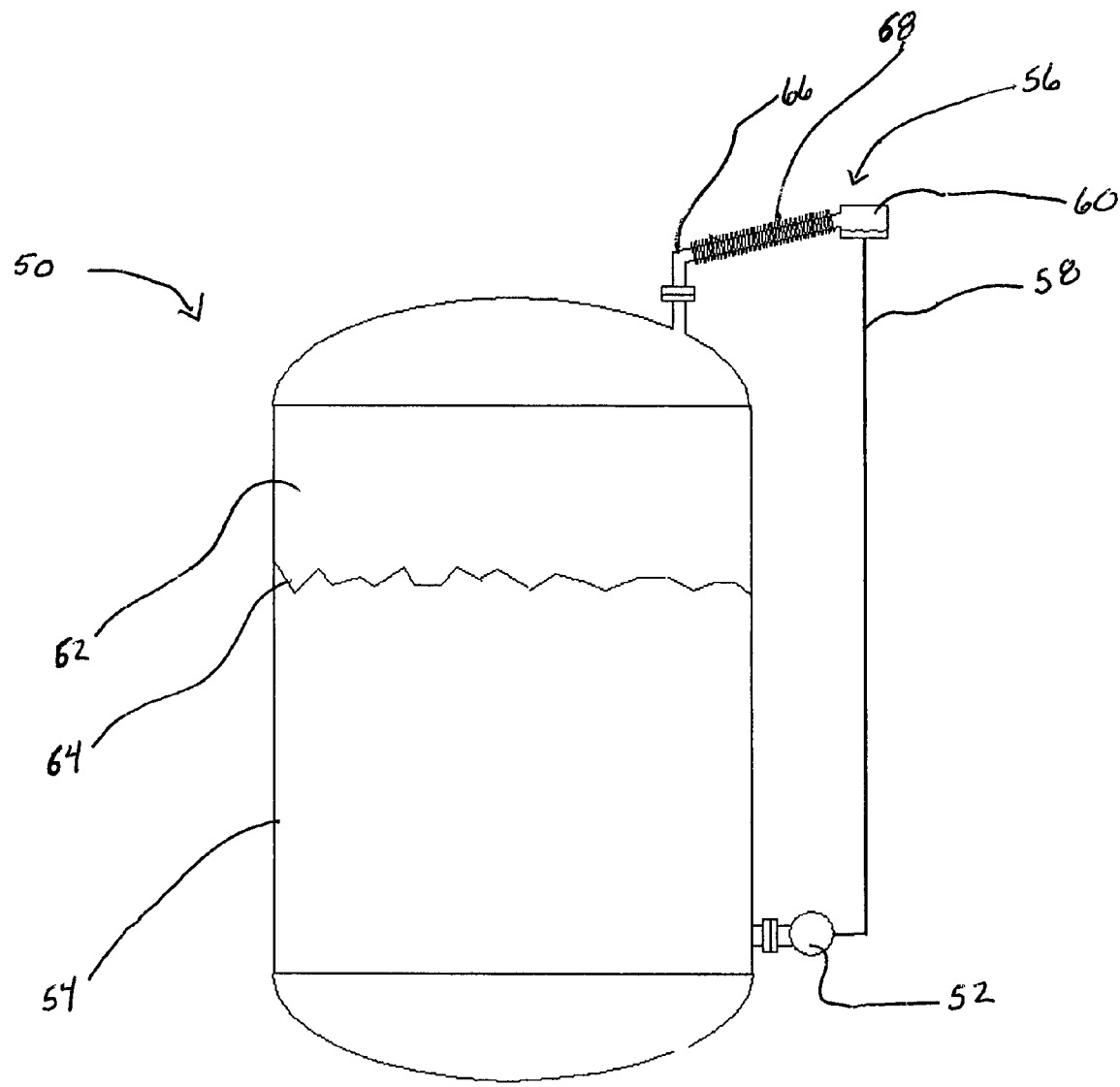
FIG. 2 is a schematic of an embodiment of a system for measuring the level of fluid in a vessel in accordance with the present invention.

FIG. 2 illustrates a system 50 with a differential pressure transducer 52 located near the bottom of a vessel 54 and a remote seal 56 located near the top of the vessel 54. The system 50 includes an external fill-fluid line 58 and an external fill-fluid reservoir 60. The vessel 54 is designed to store fluid and normally includes vapor or other such gases occupying the space 62 above the fluid level 64. In the arrangement illustrated in FIG. 2, the pressure produced by such vapor, i.e., the static vapor pressure of the vessel 54, is directly accessed by a tube 66 coupled to the vessel 54 near the top of the vessel 54. The tube 66 is also coupled to the fill-fluid reservoir 60 and provides a fluid path between the vessel 54 and the reservoir 60.

The static vapor pressure is transferred to the differential pressure transducer 52 by applying a force to fill-fluid in the fill-fluid line 58 and reservoir 60. The pressure produces a force on the fill-fluid, which in turn produces a force on the transducer 52. The tube 66 is arranged at an angle such that any condensation forming from the vapor drips back into the vessel 54. Fins 68 may be positioned around the tube 66 to assist in the condensation process.

Although the fill-fluid reservoir 60 is designed to accommodate expansion and contraction of fill-fluid as temperatures increase and decrease, the system 50 remains sensitive to temperature changes. If the system 50 experiences a drop in temperature, the fill-fluid contracts to the extent that the reservoir may be emptied. Under such conditions, the pressure sensed by the differential pressure transducer 52 due to the static vapor pressure of the vessel 54 will not be reflective of the actual static vapor pressure in the vessel 54 nor the actual liquid level.

When the system 50 of FIG. 2 is exposed to a cold environment, the viscosity of the fill-fluid may cause a failure of the system 50. The viscosity of the fill-fluid may become high enough to clog the fill-fluid line 58 or reservoir 60. In such a state, the fill-fluid will not transmit forces due to the static vapor pressure of the vessel 54 to the differential pressure transducer 52.

The accuracy of the system 50 may also be compromised due to condensation or leakage of fill-fluid. Although the system 50 does limit condensation, some moisture may still enter the reservoir 60 and add to the fluid level, thereby changing the fluid head pressure of the fill-fluid. In addition, any leakage of fill-fluid or spillage of fill-fluid from the open reservoir 60 will change the level of fill-fluid in the system 50. Any of these occurrences will jeopardize the accuracy of any measurements produced by the system 50.

Figure 3:
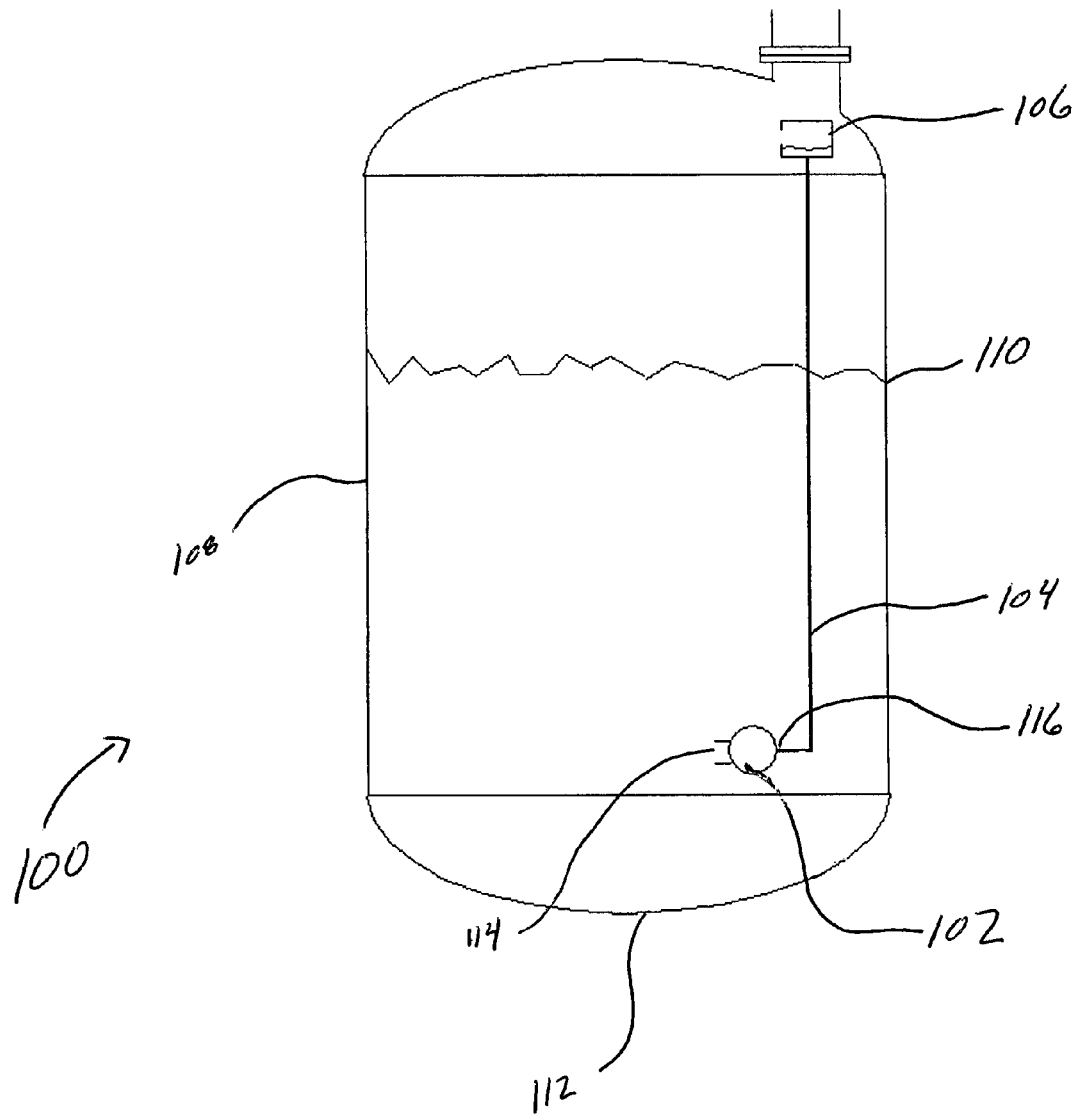
FIG. 3 is a schematic of another embodiment of a system for measuring the level of fluid in a vessel in accordance with the present invention.

FIG. 3 schematically illustrates an embodiment of the present invention. FIG. 3 shows a system 100 that includes positioning a differential pressure transducer 102, a fill-fluid line 104, and a fill-fluid reservoir 106 inside a fluid filled vessel 108. The reservoir 106 is positioned above the fluid level 110 and is exposed to the static vapor pressure of the vessel 108. The differential pressure transducer 102 is positioned below the fluid level 110 and near the bottom 112 of the vessel 108. The differential pressure transducer 102 is arranged such that a first side or process side 114 of the transducer 102 is exposed to the fluid in the vessel 108 and a second side or reference side 116 of the transducer 102 is exposed to the fill-fluid and ultimately to the vapor pressure in the head of the vessel 108.

The reservoir 106 is exposed to the static vapor pressure of the vessel 108. As such, the static vapor pressure is transferred to the differential pressure transducer 102 though the fill-fluid. The process side 114 of the transducer 102 is exposed to the pressure of the fluid in the vessel 108 and the static vapor pressure of the vessel 108. The reference side 116 of the transducer 102 is exposed to the pressure of the fill-fluid and the static vapor pressure of the vessel 108. In such an arrangement, the static vapor pressure is exposed to both the process side 114 and reference side 116 of the transducer 102 and will cancel each other out. The system 100 may be arranged such that the fill-fluid is a constant and known quantity; therefore, the only substantial unknown in the system 100 is the pressure exposed to the process side 114 of the transducer 102 due to the fluid in the vessel 108. Thus, the transducer 102 may directly determine the pressure due to the fluid in the vessel 108, and the level of fluid corresponding with that pressure may be calculated. As will be readily appreciated by those skilled in the art, such a calculation may be made by knowing the density of the fluid in the vessel 108, the dimensions of the vessel 108, and the placement of the transducer 102 with respect to the bottom 112 of the vessel 108.

As will be readily appreciated by those skilled in the art, the system 100 as illustrated and described overcomes some of the problems with prior art systems. As the differential pressure transducer 102, fill-fluid line 104, and fill-fluid reservoir 106 are positioned inside the vessel 108, errors due to temperature changes and clogging due to extreme cold temperatures are reduced or eliminated.

Figure 4:
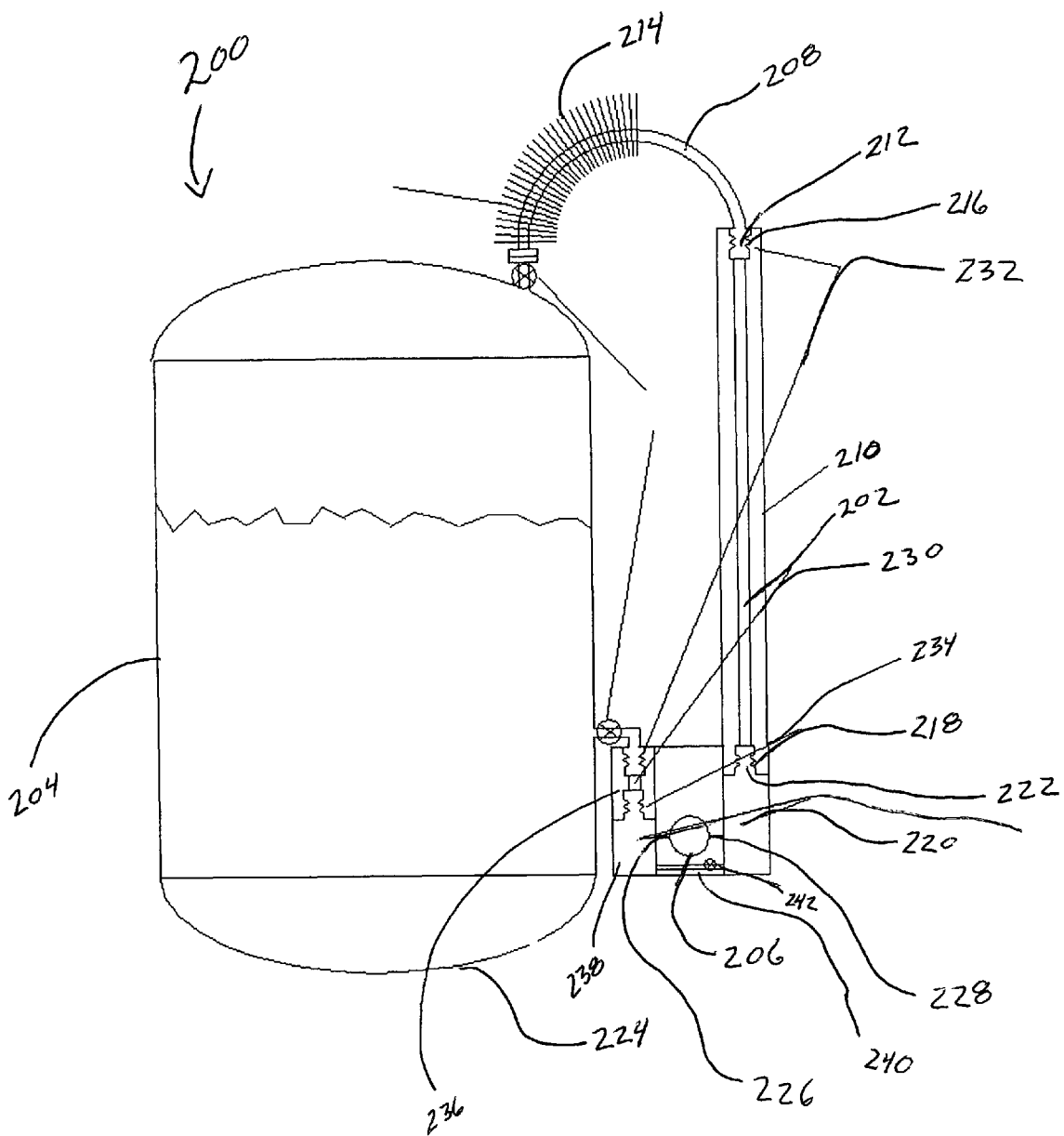
FIG. 4 is a schematic of another embodiment of a system for measuring the level of fluid in a vessel in accordance with the present invention.

FIG. 4 schematically illustrates another embodiment of the present invention. FIG. 4 shows a system 200 that includes a force transfer rod 202 for transferring static vapor pressure from a vessel 204 containing a fluid to a differential pressure transducer 206. As shown, the system includes a tube 208 coupled on one end to the vessel 204 and coupled on the other end to a sleeve 210 housing the transfer rod 202. The tube 208 exposes a first end 212 of the rod 202 to the static vapor pressure of the vessel 204. The tube 208 may optionally include fins 214 to enhance the condensation properties of the tube 208. The tube 208 is angled downward and generally arranged such that any condensation formed from vapor entering the tube 208 will drip back into vessel 204.

The transfer rod 202 includes an upper bellows 216 and a lower bellows 218 that isolate the rod 202 in the sleeve 210, while allowing the rod 202 to move relative to the sleeve 210. The rod 202 may be constructed or fabricated from steel or other such rigid material. Such construction provides a rod 202 that transfers forces though the rod 202 without substantial deformation and that contracts and expands negligibly over most temperature ranges.

The sleeve 210 further includes a chamber 220 for holding fill-fluid. The chamber 220 is located below the lower bellows 218 and supports a lower end 222 of the rod 202. The differential pressure transducer 206 is positioned near the bottom 224 of the vessel 204. A first side or process side 226 of the transducer 204 is exposed to the pressure of the fluid filling the vessel 204. A reference side or second side 228 is exposed to the fluid filled change chamber 220.

In the system 200 described, the tube 208 is exposed to the static vapor pressure of the vessel 204, and the static vapor pressure is applied to the first end 212 of the rod 208. The pressure acts as a force on the transfer rod 202, which transfers the force plus its own weight to the fill-fluid in the chamber 220. The rod 202 and bellows 216 and 218 may be arranged such that the transfer of force along the rod 202 is accomplished without significant displacement of either of the bellows 216 and 218.

In such an arrangement, the process side 226 of the transducer 206 is exposed to both the static vapor pressure and the pressure of the fluid in the vessel 204. The reference side 228 of the transducer 206 is exposed to the static vapor pressure of the vessel 204, the weight of the rod 202, and the weight of the fill-fluid in the chamber 220. As the static vapor pressure is applied to both sides 226 and 228 of the transducer 206, the static vapor pressure is cancelled out of the system. The weights of the rod 202 and the fill-fluid are known quantities; therefore, the only remaining unknown is the pressure of the fluid in the vessel 204. Thus, the transducer 206 may directly determine the pressure due to the fluid in the vessel 204, and the level of fluid corresponding with that pressure may be calculated. Such a calculation may be made by knowing the density of the fluid in the vessel 204, the dimensions of the vessel 204, and the placement of the transducer 206 with respect to the bottom 224 of the vessel 204.

Optionally, a second force transfer rod 230, a second upper bellows 232 and lower bellows 234, a second sleeve 236 to house the rod 230, and a second fill-fluid chamber 238 may be positioned between the process side 226 of the transducer 206 and the vessel 208. In such an arrangement, the spring constant of the two lower bellows 218 and 234 are substantially the same, and the volume and temperature of the two fill-fluid chambers 220 and 238 are substantially the same; therefore, thermal effects on the fluid volume density or the elasticity of the bellows are negligible.

Optionally, the rods 202 and 230 and sleeves 210 and 236 are manufactured or fabricated from the same material, such as high-strength steel, and are protected by insulating material wrapped around the sleeves 210 and 236. Thus, when the sleeves 210 and 236 and rods 202 and 230 are exposed to the same temperature, they expand and contract together without causing any significant displacement or increase in load on the fill-fluid. To further increase the equilibrium between the process side 226 and reference side 228 of the transducer 206, a fluid passage 240 may be formed between the chambers 220 and 238 to place the chambers 220 and 238 in fluid communication. A valve 242 may be included in the passage 240 to selectively open the passage 240 between the chambers 220 and 238.

In the arrangement illustrated in FIG. 4 and described herein, measurement errors due to thermal expansion are minimized or eliminated by the use of force transfer rods to transfer the static vapor pressure from the vessel to the transducer. In addition, such an arrangement minimizes the volume of fill-fluid needed. When the bellows are manufactured or fabricated from high strength materials, the vapor is sealed away from the fill-fluid, and hydrogen migration or permeation problems are eliminated. In addition, the valve 242 and the fluid passage 240 allow for the establishment of a zero position, enabling precision field offset calibration.

When the force transfer mechanism of this embodiment is combined with a temperature-tolerant fiber optic-based differential pressure transducer, the advantages are multiplied, as the system can operate at temperatures exceeding 500° F. with inherent safety even in explosion hazardous areas.

Figure 5:
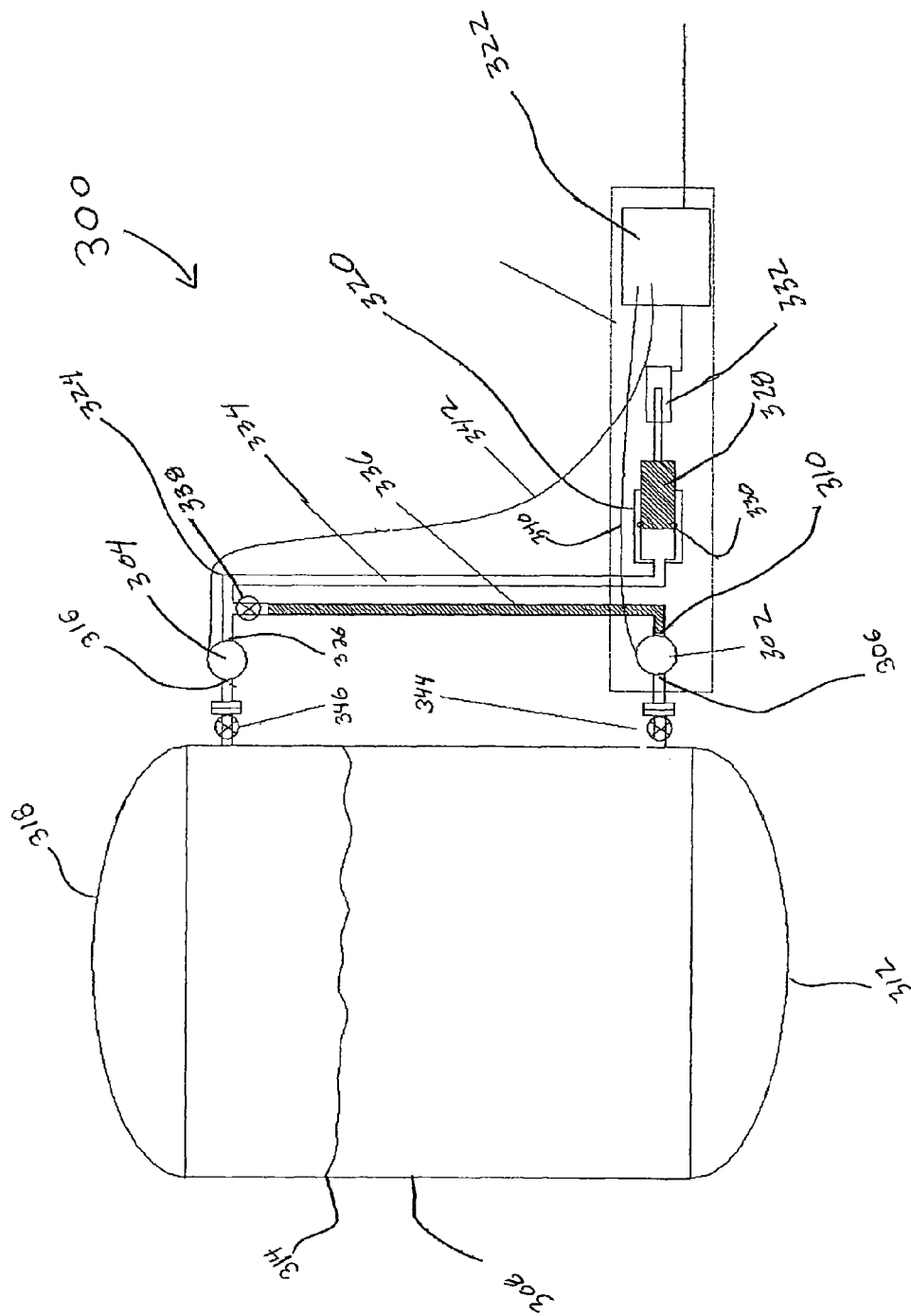
FIG. 5 is a schematic of another embodiment of a system for measuring the level of fluid in a vessel in accordance with the present invention.

FIG. 5 illustrates another embodiment of the present invention. In this embodiment, a system 300 utilizes two differential pressure transducers 302 and 304. A first or measurement differential pressure transducer 302 is similar to the transducers described above. The measurement transducer 302 has a first or process side 306 exposed to a pressure caused by fluid in a vessel 308 and a second or reference side 310 exposed to a pressure based on the static vapor pressure in the vessel 308. The measurement transducer 302 is positioned near the bottom 312 of the vessel 308 and generally below the fluid level 314 of the fluid in the vessel 308. A second or feedback transducer 304 is positioned near the top 318 of the vessel 308, with a first side or process side 316 exposed to the static vapor pressure of the vessel 308.

The system 300 further includes a pressure delivery system 320, a signal processor 322, and a fluid passage 324. The fluid passage 324 is arranged to maintain a pressure and places a second or reference side 326 of the feedback transducer 304, the reference side 310 of the measurement transducer 302, and the pressure delivery mechanism 320 into fluid communication with each other. This is to say that any pressure in the fluid passage 324 will be applied to the reference side 326 of the feedback transducer 304, the reference side 310 of the measurement transducer 302, and the pressure delivery mechanism 320. As will be readily appreciated by those skilled in the art, the fluid passage 324 may be any arrangement of pressure lines, piping, tubing, or the like capable of maintaining a pressure.

The pressure delivery system 320 is arranged to selectively pressurize the fluid passage 324. As shown in FIG. 5 and described above, when the pressure delivery system 320 pressurizes the fluid passage 324, the pressure in the fluid passage 324 is applied to the reference side 326 of the feedback transducer 304 and the reference side 310 of the measurement transducer 302. In the arrangement illustrated, the pressure delivery system 320 includes a piston 328 located within a cylinder 330. The piston 328 may be actuated by an actuator 332 to move in a first direction within the cylinder 330 so as to increase pressure in the fluid passage 324 and may be actuated in the opposite direction so as to decrease pressure in the fluid passage 324. The pressure delivery system 320 as described herein is a piston and cylinder arrangement; however, it will be readily appreciated by those skilled in the art that the illustration and description in no way limit the structure of the pressure delivery system 320. The pressure delivery system 320 may be any system or mechanism capable of pressurizing a fluid passage.

The signal processor 322 is arranged to accept signals and deliver signals within the system 300. In addition, the signal processor 322 may be arranged to calculate values or other parameters, or generally execute logic based on input signals and stored information. The signal processor 322 may include a microprocessor, digital storage, or other such equipment to receive signals, deliver signals, calculate values, and the like.

The signal processor 322 is in communication with the feedback transducer 304 and the pressure delivery mechanism 320. The processor 322 is arranged to receive a signal from the feedback transducer 304, analyze the signal, and deliver another signal to the pressure delivery system 320. In one embodiment, the signal processor 322 directs the pressure delivery mechanism 318 to pressurize the fluid passage 324 to a pressure that is equivalent to the static vapor pressure of the vessel 308. Similar to the descriptions above, pressurizing the fluid passage 324 to the equivalent of the static vapor pressure of the vessel 308 will cancel the effect of the static vapor pressure on the process side 306 and reference side 310 of the measurement transducer 302. Since the process side 308 of the transducer 306 is exposed to the combination of the static vapor pressure and pressure resulting from the fluid in the vessel 308, applying a pressure equivalent to the static vapor pressure to the reference side 310 of the transducer 306 cancels the vapor pressure from the measurement, thus leaving the pressure due to the fluid in the vessel 308 as the only unknown quantity. Such an arrangement allows the level of the fluid to be calculated from the pressure measurement of the measurement transducer 302. The feedback transducer 304 may monitor the pressure in the fluid passage 324 and the static vapor pressure of the vessel 308. As the two pressures become unbalanced, the feedback transducer 304 may provide feedback to the signal processor 322 to balance the pressures.

Optionally, the fluid passage 324 may be divided into two legs or portions. For example and with reference to FIG. 5, the passage 324 may be divided into a first leg 334 extending from the reference side 324 of the feedback transducer 304 to the pressure delivery mechanism 320 and a second leg 336 extending from the first leg 334 to the reference side 310 of the measurement transducer 302. In one embodiment, the second leg 336 is at least partially filled with hydraulic fluid, and the first leg 334 is filled with air or other similar gas. The second leg 336 optionally may include a valve 338 to insure hydraulic fluid does not leak into the first leg 334. In such an arrangement, the signal processor 322 may take the volume of hydraulic fluid, and thus its pressure effect on the measurement transducer 302, into account when directing the pressure delivery mechanism 320 to pressurize the fluid passage 324. A processor 322 may perform a calculation to insure that the sum of the pressure in the fluid passage 324 and the pressure due to the weight of the hydraulic fluid equals the static vapor pressure of the vessel 308. The feedback transducer 304 again may monitor the pressure in the fluid passage 324 relative to the static vapor pressure and provide feedback to the signal processor 322 to continuously adjust the system.

Optionally, the measurement transducer 302 may be placed in communication with the signal processor 322. The processor 322 may evaluate a signal from the measurement transducer 302 to determine the fluid level in the vessel 308. The density and amount of hydraulic fluid in the fluid passage 324 are known quantities, as are the placement of the measurement transducer 302 with respect to the bottom 312 of the vessel 308 and the density of the fluid in the vessel 308; therefore, the only remaining unknown is the pressure caused by the fluid in the vessel 308. Thus, the transducer 302 may directly determine the pressure due to the fluid in the vessel 308. Once a signal is relayed to the signal processor 322 by the measurement transducer 302, the level of fluid corresponding with that pressure may be calculated by the processor 322.

As illustrated in FIG. 5, the measurement transducer 302 may be placed in communication with the signal processor 322 by a connector 340. The connector 340 may be, for example, a wire arranged to carry an electrical signal based on movements within the transducer 302. In another example, the connector 340 may be an optical fiber arranged to carry an optical signal based on movement within the transducer 302. Similarly, the feedback transducer 304 may be placed into communication with the signal processor 322 by another connector 342 that is capable of carrying electrical signals, optical signals, mechanical signals, and the like.

Optionally, a pair of valves 344 and 346 may be arranged between the vessel 408 and the transducers 302 and 304. The valves 344 and 346 may be closes to isolate the transducers 302 and 304 from the vessel 408. The closing of the values 344 and 346 may facilitate the temporary shutting down of the apparatus or repair and maintenance of the apparatus.

The arrangement as illustrated in FIG. 5 and described herein eliminates or minimizes problems associated with hydrogen migration and permeation, condensation, plugging or clogging, thermal effects, and leakage of fill-fluids and results in improved measurement of fluid levels within vessels.

A differential pressure transducer, as used herein, may be any type of transducer. The transducer may relay pressure differentials in a variety of ways. For example, a transducer may produce an electrical signal that varies based on the stretching of a diaphragm of the transducer. In another example, a transducer may vary an optical signal based on the movement of a diaphragm or other element in the transducer and relay the signal along an optical fiber. In yet another example, a mechanical signal may be produced based on movements of a transducer. The examples of transducers illustrated and described herein will not limit the scope of a transducer as practiced with this invention.

When any of the embodiments described herein is combined with a temperature-tolerant fiber optic differential pressure transducer, the advantages to industry are multiplied, as the differential pressure transducers can operate at temperatures exceeding 500° F., can withstand differential pressures of 3000 psi without rupture or the need for recalibration, and can operate with inherent safety even in explosion hazardous areas.

The invention has been described above and, obviously, modifications and alternations will occur to others upon the reading and understanding of this specification. The claims as follows are intended to include all modifications and alterations insofar as they come within the scope of the claims or the equivalent thereof.

Having thus described the invention, we claim:

1. A system comprising:
a first differential pressure transducer comprising:
a first side selectively in fluid communication with a portion of the vessel above the fluid level; and
a second side;
a second differential pressure transducer comprising:
a third side selectively in fluid communication with a portion of the vessel below the fluid level; and
a fourth side;
a pressure delivery mechanism; and
a fluid passage in fluid communication with the second side, the fourth side, and the pressure delivery mechanism, wherein the fluid passage comprises a first portion extending between the second side and the pressure delivery mechanism and a second portion extending from the first portion to the fourth side, said second portion being at least partially filled with hydraulic fluid.

2. The system of claim 1 where the first differential pressure transducer is in communication with the pressure delivery mechanism.

3. The system of claim 2 where the pressure delivery mechanism includes a piston moveably positioned in a cylinder to selectively deliver pressure to the fluid passage.

4. The system of claim 3 where the piston is moved in the cylinder to equate the pressure delivered to the fluid passage to a pressure sensed in the portion of the vessel above the fluid level.

5. The system of claim 3 further comprising a signal processor, where the signal processor receives a signal from the second differential pressure transducer and determines the level of fluid in the vessel based on at least the signal from the second differential pressure transducer.

6. The system of claim 1 where the first differential pressure transducer is a fiber optic differential transducer.

7. The system of claim 6 further comprising a signal processor in optical communication with the first differential pressure transducer and in electrical communication with the pressure delivery mechanism.

8. The system of claim 7 where the signal processor receives an optical signal from the first differential pressure transducer and calculates a pressure in the portion of the vessel above the fluid level.

9. The system of claim 8 where the signal processor sends an electrical signal to the pressure delivery mechanism to deliver a pressure to the fluid passage that is equivalent to the pressure calculated for the portion of the vessel above the fluid level.

10. The system of claim 9 where the fluid passage comprises a first portion and a second portion;
wherein, the first portion extends between the second side and the pressure delivery mechanism and the second portion extends from the first portion and the fourth side.

11. The system of claim 10 where the second portion of the fluid passage is at least partially filled with hydraulic fluid.

12. The system of claim 1 where the second differential pressure transducer is a fiber optic differential pressure transducer.

13. The system of claim 12 further comprising a signal processor in optical communication with the second differential pressure transducer.

14. The system of claim 13 where the signal processor receives an optical signal from the differential pressure transducer and calculates a pressure in the portion of the vessel below the fluid level.

* * * * *